Nov. 11, 1941.   F. L. MOSELEY ET AL   2,262,245
CATHODE RAY FLIGHT INDICATOR
Filed July 28, 1938   4 Sheets-Sheet 1

INVENTORS
FRANCIS L. MOSELEY &
JOSEPH LYMAN
BY
THEIR ATTORNEY

Nov. 11, 1941.    F. L. MOSELEY ET AL    2,262,245
CATHODE RAY FLIGHT INDICATOR
Filed July 28, 1938    4 Sheets-Sheet 3
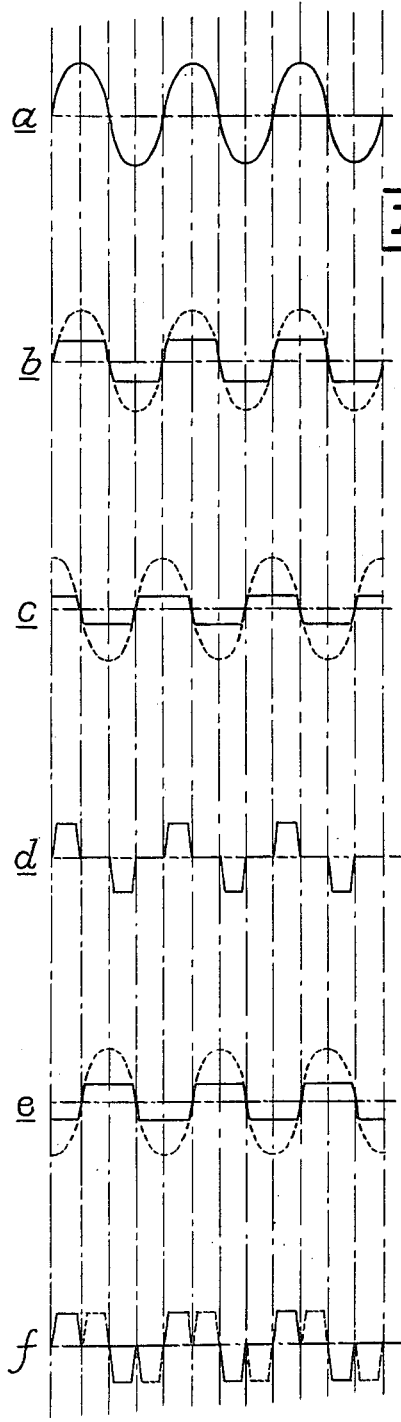
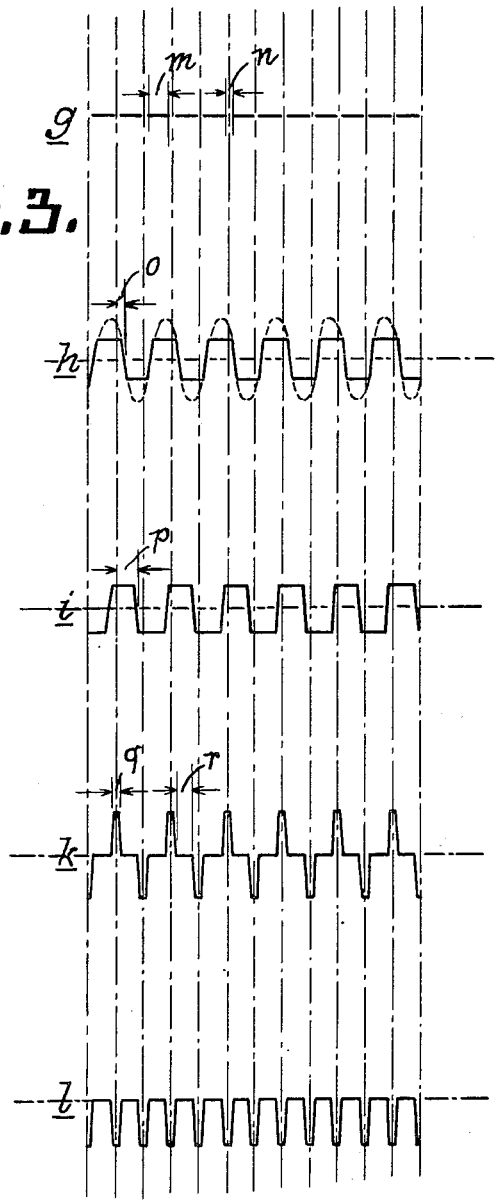
Fig. 3.
INVENTORS
FRANCIS L. MOSELEY
JOSEPH LYMAN
BY
THEIR ATTORNEY INVENTORS
FRANCIS L. MOSELEY &
JOSEPH LYMAN
BY Herbert H. Thompson
THEIR ATTORNEY Patented Nov. 11, 1941

2,262,245

UNITED STATES PATENT OFFICE 2,262,245

CATHODE RAY FLIGHT INDICATOR

Francis L. Moseley, Pelham, and Joseph Lyman, Huntington, N. Y., assignors to Sperry Gyroscope Company, Inc., Brooklyn, N. Y., a corporation of New York Application July 28, 1938, Serial No. 221,706

12 Claims. (Cl. 177—311)

This invention relates, generally, to aircraft instrument indicators and, more particularly, to aircraft flight indicators of the type which show on one face the combined information collected from a plurality of separate instruments.

The principal objects of the present invention are improvements in aircraft flight indicators of the cathode ray tube type, in which the beam of the cathode ray tube is made to indicate simultaneously information provided from several important flight instruments. The copending application of Francis L. Moseley, Serial No. 101,274, filed September 17, 1936, for Aircraft flight indicator and control system therefor, shows in detail a flight indicator of the cathode ray type and, generally, the improvements set forth in this invention apply directly to an instrument of this type.

One improvement comprises a novel arrangement whereby some of the indications on the face of the cathode ray tube which are normally used during straight flight can, by means of a switch, be converted into indications signifying the attitude and position in space of an aircraft when approaching an airport, where signals of the radio course beam receiver and the radio landing beam receiver are picked up and used to guide the airplane to a safe landing.

A further improvement is a novel and superior type of commutation, which in the former application was accomplished by a mechanical commutator. The present invention uses electronic means of great simplicity, of low cost, and without any moving parts.

A further improvement lies in the means employed to eliminate the back trace of the cathode ray beam which, if not suppressed, would seriously disturb the intelligent interpretation of the indications on the face of the cathode ray tube. While formerly mechanical means in the form of a commutator were used to eliminate the back trace of the cathode ray beam, we now use improved, simple electronic means of great reliability to accomplish the same purpose.

Other objects, advantages and applications of the present invention will become apparent from the specification and the accompanying drawings, wherein the details of the invention are embodied.

In the drawings,

Fig. 3 is a schematic analysis of the electronic commutator and the electronic back trace eliminator.

Figs. 4 and 5 are views of the face of the cathode ray tube, showing indications thereon of the various instruments in varying flying attitudes of the airplane.

Figure 1:
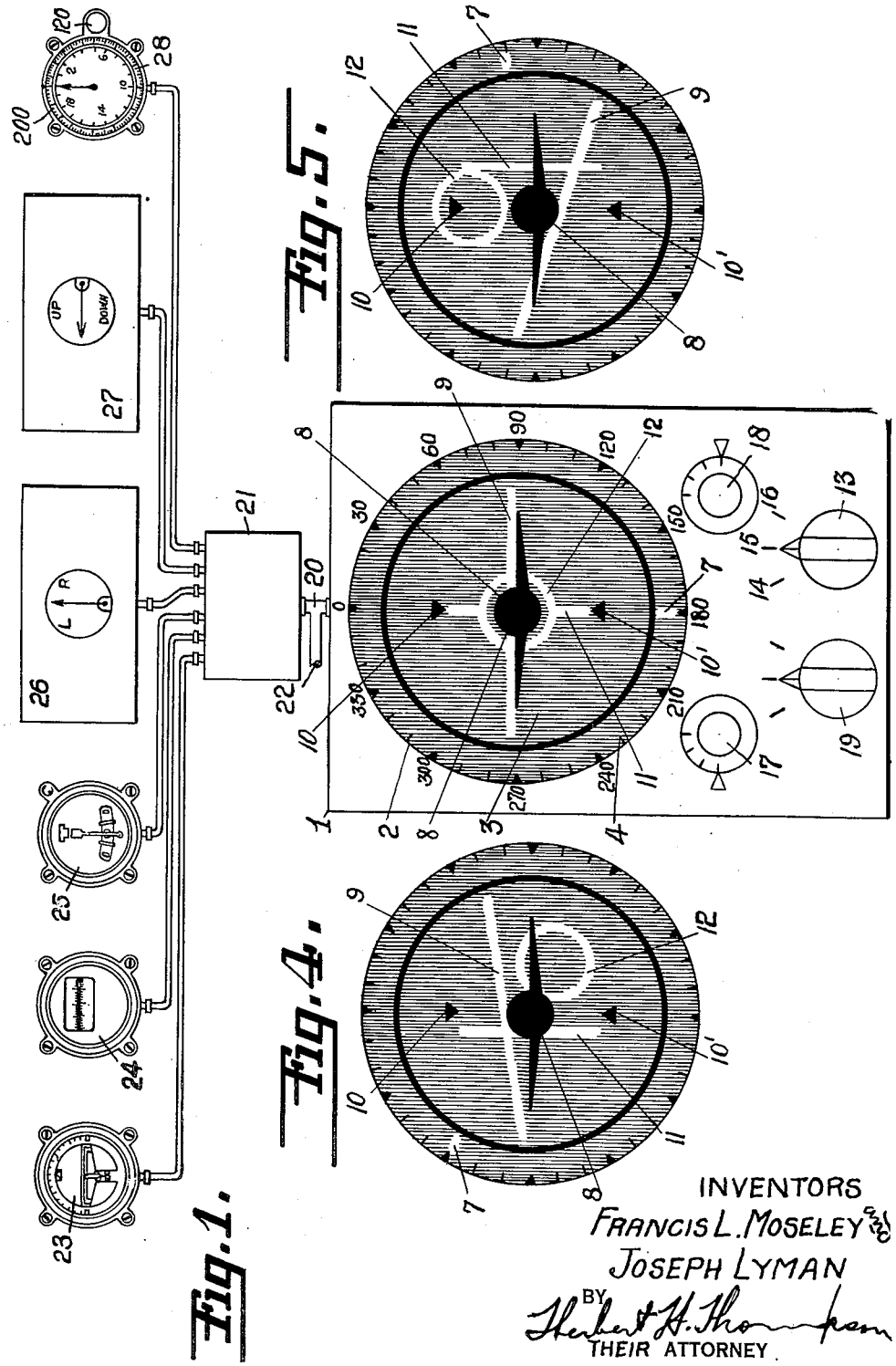
Fig. 1 is a schematic view illustrating the flight indicator of this invention, including the primary flight instruments from which the signals are obtained.

Referring to Fig. 1 of the drawings, 1 designates the flight indicator casing showing the face of the cathode ray tube and the several switches employed. This case is mounted on the instrument board in front of the pilot in such a way that an unobstructed view of the face of the instrument is obtained, while at the same time the switch knobs are easily accessible by hand. The front panel of the indicator is provided with a circular aperture 2, through which the sensitized face of the cathode ray tube 3 is visible. Annularly disposed around this aperture are graduations 4, corresponding to degree or compass markings, for use in conjunction with the cathode beam spot 7 in determining the bearing or course of the craft. A small black circular disc 8 is shown in the center of the face, representing the fuselage of an airplane. The wings indicate a line parallel to the transverse axis of the aircraft and are used in conjunction with a horizontal trace 9 of the cathode beam, which serves to indicate the artificial horizon line. This line is adapted to be raised or lowered if the airplane pitches, or to pivot around its center in case of roll of the craft, or to do both. Vertical marks 10 and 10' are used in conjunction with a vertical cathode beam trace 11 in indicating turns of the craft.

A circular cathode ray beam trace 12 is normally located in such a way that it is concentric with the center circle 8 on the face of the tube. This circular trace is used to indicate two things, namely, (1) during normal flight, the changes in altitude or level at which the airplane is flying by using indications from an altimeter, and (2) during the landing operation, to indicate whether or not the airplane is correctly on the track of both the radio landing beam and the radio course beam. The combination of the circular trace 12 with the horizontal trace 9 when both said traces are in their normal positions, exhibits in miniature, as a luminous image, the outline of an airplane and this luminous image cooperates with the fixed airplane marking on the face of the cathode ray tube, which includes disc 8, to indicate normal flight conditions. Thus, circle 12 is concentric with and surrounds disc 8, representing the fuselage of the plane, when either altitude or position relative to the radio beam is normal, depending on which type of control is used, while horizon bar 9 coincides with or is closely adjacent to the wings of the fixed plane marking under level flight conditions. Any departure from normal flight conditions is immediately apparent in the destruction of this close relationship of fixed marking and movable luminous image. A switch knob 13 serves to change the control of the movements of the circular trace 12 from the altimeter during straight flight to the radio course beam and landing beam during the landing operation. The knob 13 can be put into three positions 14, 15 and 16. In position 14 the instrument is shut off, in position 15 the instrument is used for straight flight, and in position 16 the instrument is used for landing.

A cathode beam intensity knob 17 and a focusing knob 18 may also be provided on the front of the panel in order to enable the operator to have the beam properly focused and of correct brilliance to make it clearly visible even under daylight conditions.

A knob 19 is provided for controlling the caging and setting of the directional gyroscope, as fully explained and set forth in the aforesaid application No. 101,274. Further reference to the devices associated with knob 19 is omitted from this specification.

A cable 20 connects the flight indicator to a case 21 containing the detecting, amplifying and commutating apparatus, which may be located at any convenient place on the airplane. Additional flight indicators located at convenient points on the plane may be operated from the control mechanism 21 by means of branch cable 22.

The control apparatus 21 is connected by a series of cables to the various conventional rate and attitude instruments, whose indications are to be shown on the face of the indicator 1. These instruments are shown as including a gyroscopic artificial horizon 23, a directional gyroscope or compass 24, a turn indicator 25, a radio course beam receiver 26, a radio landing beam receiver 27, and an altimeter 28. Although these instruments are shown in the drawings as they might appear on the instrument board of the aircraft, it is to be understood that they need not be mounted on the instrument panel, but may be located at any suitable point on the aircraft, as their indications are repeated on the face of the indicator 1. There is therefore no necessity for dials and faces on the separate instruments, so that these instruments may be made in skeleton form, thereby greatly simplifying their design and reducing their cost.

With the exception of the two radio beam receivers, all of the instruments are preferably provided with capacity pick-offs, by means of which the particular position of the indicating parts of the instruments with respect to their housings is converted into differences of electrical potential in such a way as to make the indication applicable to the amplifying and detecting apparatus contained in case 21. These capacity pick-off means are preferably similar to those shown in detail in the copending application Serial No. 101,274.

Figure 2:
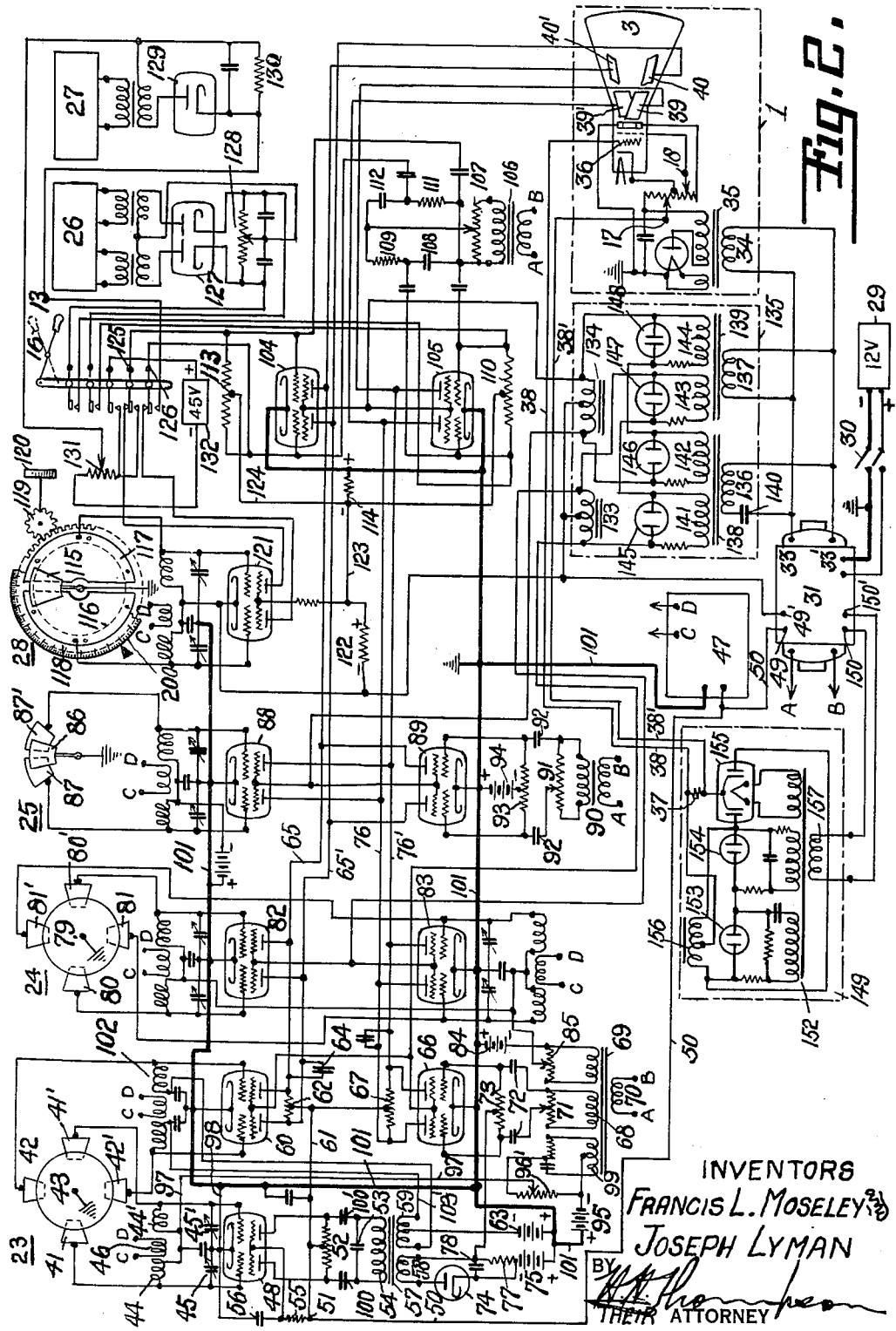
Fig. 2 is a wiring diagram of the improved form of flight indicator and control system.

Referring to the wiring diagram of Fig. 2, a storage battery 29 is shown as the supply source which is connected to dynamotor 31 through switch 30, preferably turned by knob 13. Dynamotor 31 supplies the various voltages used to energize the amplifying, detecting and commutating apparatus.

The cathode ray tube indicator is shown by the dot-dash box 1 containing the cathode ray tube 3 and a power supply associated with this tube. Alternating current generated by the dynamotor 31 is led from terminals 33 and 33' to the primary winding 34 of transformer 35. The rectifier and filter circuits to supply the cathode ray tube 3 are of conventional design, with the exception of the leads to the grid 36, which include the resistor 37 and the leads 38 and 38', the function of which is explained hereinafter. The filament supply circuit for the cathode ray tube is not shown and has also been omitted for most of the other vacuum tubes in order to simplify the wiring diagram.

The cathode ray tube has a set of horizontal deflection plates 39 and 39' and a set of vertical deflection plates 40 and 40'. These pairs of deflection plates are independently fed with such voltages as are required to produce the desired indications on the face of the tube, by means of suitable oscillations and cause deflections of the cathode ray beam.

Indicated by the numeral 23 is the artificial horizon, of which in these drawings there are only shown the devices used for taking off the necessary indications for roll and pitch. The roll indication is provided by the condenser plates 41 and 41', while the pitch is derived from plates 42 and 42'. A spherically shaped mushroom condenser plate 43 cooperates with the four stationary condenser plates 41, 41', 42 and 42' on the artificial horizon in such a way that in case of roll, a relative change of capacity is effected between plates 41 and 41', and in case of pitch a relative change of capacity is effected between plates 42 and 42', this change decreasing capacity on one plate while at the same time it is increasing capacity on the other plate. Plates 41 and 41' are connected to two cross connected radio frequency transformer coils 44 and 44'. Across these coils there are connected adjustable condensers 45 and 45', by means of which the circuit consisting of coils and condensers can be tuned to a desired frequency. The primary 46 of the radio frequency transformer has two terminals C and D. These terminals are provided with radio frequency potential from a separate radio frequency oscillator 47, of conventional design, having corresponding terminals C and D, the connecting leads being omitted for the sake of simplicity. By means of the trimming condensers 45 and 45', the two circuits containing coils 44 and 44' are both tuned to a frequency somewhat removed from the frequency of oscillator 47. When, in response to a relative movement between condenser plates 41, 41' and 43, the resonant frequencies of the two tuned circuits are moved away from the common frequency to which they are normally tuned, the potentials induced across these circuits by the oscillator current in coil 46 will be raised or lowered accordingly as the resonant frequency is moved toward or away from the oscillator frequency.

In case of a roll, as explained before, a differential change of capacity occurs between condenser plates 41 and 41', resulting in corresponding opposite changes of resonance voltages in the coils 44 and 44', so that a differential potential occurs across the control grids of a thermionic or vacuum tube 48. Said tube is of the screen grid type and preferably contains two complete screen grid tubes in one envelope. It is understood, however, that two separate tubes could be used with equal results. The plate energy for this tube is supplied by the dynamotor 31 from its terminals 49 and 49'. The preferred voltage from these two terminals is 500 volts D. C. with the positive terminal located at 49. The positive potential is carried by lead 50 to the point 51 and from there to the center tap of resistor 52. From the free ends of this resistor the voltage is applied to the plates of tube 48. The screen grids of the tube 48 are supplied with D. C. of somewhat lower potential through the resistor 55, while a condenser 56 in the conventional manner bypasses the screen grids to the cathode. A similar bypassing condenser is used to bypass the plate supply to the cathode, and other condensers, not designated, bypass the bias batteries in well known manner. The control grids of the tube are biased by two different potentials, one a D. C. potential supplied by battery 95, and the other one preferably an audio frequency of between 500 and 1000 cycles obtained from the adjustable potentiometer 96 by means of winding 99 of transformer 69, the primary 70 of which is supplied from the terminals A and B of dynamotor 31. In practice, this frequency should be a multiple of the frequency supplied by terminals 33 and 33'; for example, if the former supplies 60 cycles, terminals A and B preferably should supply 600 cycles. A phase-shifting network of known design across winding 99 serves the purpose of fixing the phase angle of the A. C. bias with respect to other cooperating voltages. The sum of these bias potentials is applied between cathode and grids by means of leads 97 and 98. If both control grids are balanced, there will be no output from tube 48. If they become unbalanced in one direction, the 600 cycle output superimposed on a D. C. potential appears across resistor 52, while the 600 cycle component alone appears across the primary coil 54 of transformer 57, the D. C. component being blocked by condensers 100 and 100' and the radio frequency component being bypassed through condenser 53. Therefore, only the 600 cycle component passes through transformer 57, the primary 54 of which is tuned to 600 cycles by condenser 53. Unbalance in the opposite way produces a similar potential across coil 54, but of opposite phase.

It is obvious from the foregoing explanation that the 600 cycle voltages appearing across secondary coils 58 and 59 of transformer 57 will be substantially proportional as to phase and amplitude to the sign and angle of roll of the airplane as indicated by the relative motions between condenser plate 43 and condenser plates 41 and 41'.

Pitching motions of the airplane which would result in relative change of capacity between plates 42 and 42' are received by vacuum tube 60 in a similar way. The D. C. plate voltage is applied to tube 50 by means of lead 61 and is conducted to the center tap of resistor 62, so that normally equal amounts of static plate current flow to both plates of tube 60. If the control grids of the tube 60 are unbalanced by relative change of capacity, as explained before, unequal amounts of plate current will flow through the two halves of resistor 62, resulting in a variable reversible D. C. potential across resistor 62, the radio frequency component being filtered out by condenser 64. Tube 60 is biased by means of battery 63, which with its positive terminal is connected to the common ground and cathode lead 101, marked by a heavier line in the diagram, and with its negative terminal to the center tap of winding 59 of transformer 57. This winding, as explained before, carries 600 cycle A. C. potentials proportional to roll as to phase and amplitude, and is connected to the inner terminals of R. F. transformer 102 by means of leads 103, so that the control grids of tube 60 receive opposite 600 cycle signals proportional to roll. Across resistor 62 there appears the pitch signal in the form of variable reversible D. C. and, modulating this D. C. potential, a 600 cycle variable reversible roll signal. This modulated output, through the leads 65 and 65', is directly applied to the vertical deflection plates 40 and 40' of the cathode ray tube 3.

In order to utilize this combined output, it is necessary to have on the screen of the cathode ray tube a suitable trace of the electron beam, which can be deflected by said output so as to allow correct interpretations of roll and pitch indications. To accomplish this purpose, a horizontal trace is put on the screen of tube 3 by means of vacuum tube 66. The plate supply for this tube is again obtained from lead 61 through the center tapped resistor 67 in a similar way as shown for the previous tubes. The control grids of tube 66 receive signals from two places. A 600 cycle signal is derived from winding 68 of transformer 69 and, after adjustment to the desired amount by means of the potentiometer 71, is conducted through two blocking condensers 72 to the control grids of tube 66, which are influenced in equal and opposite way through the use of a center tapped resistor 73. The bias battery 75 provides suitable D. C. grid bias between cathode and control grids of tube 66. The output of the tube is an amplified 600 cycle A. C. potential appearing across resistor 67. This A. C. potential, by means of leads 76 and 76', is conducted directly to the horizontal deflecting plates 39 and 39' of the cathode ray tube 3, resulting in a horizontal oscillation of the beam at 600 cycles, the amplitude of which is adjustable by potentiometer 71. Obviously, if now D. C. potentials are applied through tube 60 to the vertical deflection plates, the horizontal beam trace, which normally would be in the middle of the face of the tube, will be deflected to a parallel position upwardly or downwardly proportional to the amount of D. C., the direction of deflection being controlled by the sign of the D. C. generated by tube 60. As this D. C. in its amount and sign is dependent upon the pitch motion of the ship, it is obvious that the position of the airplane on the face of the tube with respect to the horizontal trace of the beam would substantially proportionally indicate the fore and aft inclination of the ship with respect to the actual horizon.

The roll motions of the ship, as explained before, also result in a 600 cycle potential across the vertical deflection plates and, being variable as to sign and amount with the roll of the ship and acting perpendicular to the horizontally deflecting 600 cycle potential, will tilt the horizon bar trace depending upon the amount of roll of the ship, as indicated by the proportional unbalance of the condenser plates 41 and 41'.

The horizontal trace 9 obviously will be limited in its horizontal length by two vertical lines drawn on the face of the instrument at a distance from each other equal to the length of the trace in its neutral position, so that as the beam tilts, its actual length would be undesirably increased, as the horizon bar thereby might obscure other indications on the face of the instrument. A further reason for limiting the length of the bar as it tilts is that a short bar requires less voltage on the deflecting plates for a given angle of tilt than a longer bar and therefore less signal gain. We therefore prefer to keep the length of the horizon bar constant regardless of tilt, so that it always is a true picture of the actual horizon bar on the artificial horizon. This is accomplished by controlling the gain of tube 66, which generates the horizontal beam, so that its output becomes inversely proportional to the amplitude of the output signal of tube 48 as obtained across transformer coil 58 of tube 57. As this voltage must not change its sign with the roll of the gyro horizon, we employ a rectifier tube 74 to rectify the signal derived from winding 58, thereby converting this signal into a D. C. potential of one polarity only and proportional to the amplitude of the A. C. signal across winding 58. A conventional filter network consisting of resistor 77 and condenser 78 is used for this purpose. The D. C. voltage appears across the resistor 77 and is subtracted from the bias voltage of battery 75 and therefore influences both control grids of tube 66 in the same sense. The result is that the gain of tube 66 is decreased proportionally to the roll of the gyro horizon, but independently of the direction of the roll. Inasmuch as the output voltage of tube 48 controls the length of the horizontal beam trace, this trace will be shortened whenever it tilts in either direction, thereby confining its length to a circle with the horizontal beam as the diameter.

Figure 6:
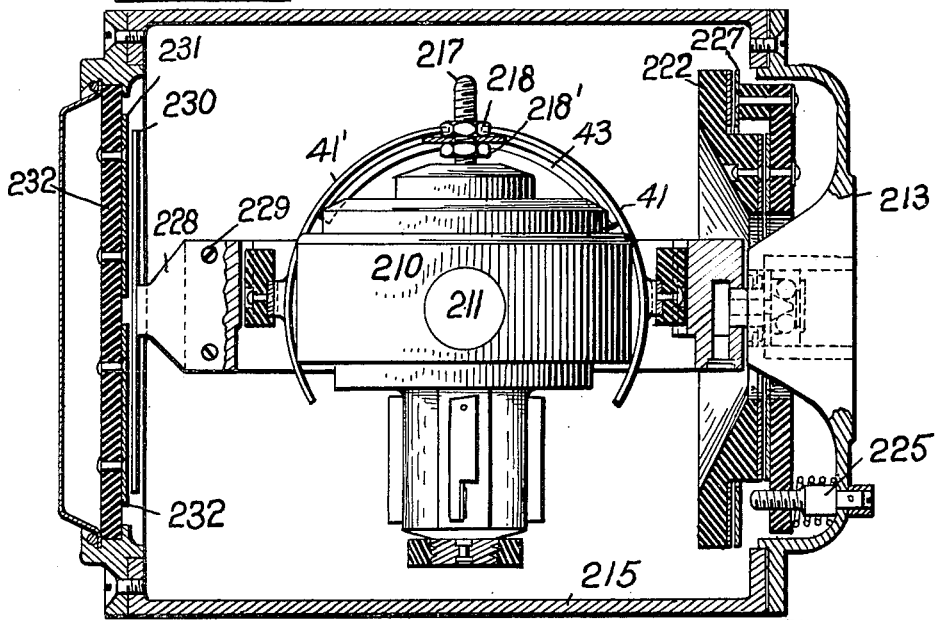
Fig. 6 is a vertical cross section of a preferred type of artificial gyroscopic horizon as used in the flight indicator.
Figure 7:
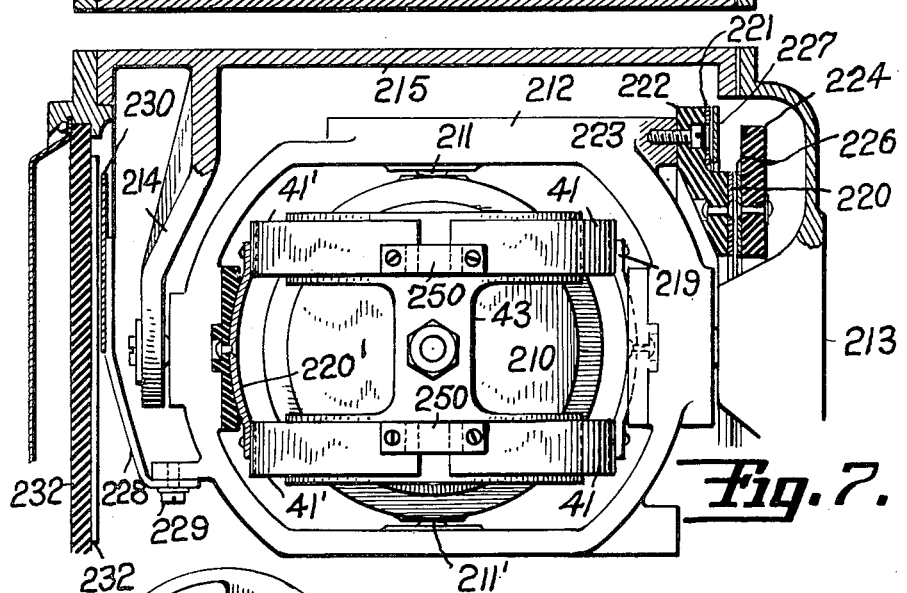
Fig. 7 is a horizontal sectional view of the same instrument.
Figure 8:
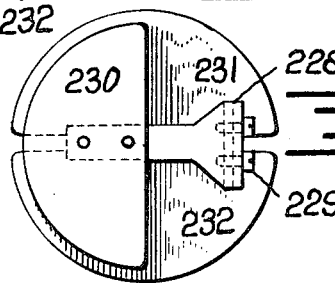
Fig. 8 is an end view of the condenser pick-off for the athwartship axis of the horizon.

Figs. 6, 7 and 8 show an improved form of capacity pick-off which may be used to provide signals from the artificial horizon. In principle it is similar to the system shown schematically in Fig. 2 for the horizon, but the practical embodiment of the invention is different from that shown in Fig. 2 and also different from the one shown in the previous copending application Ser. No. 101,274. The artificial horizon 210, which may be of the gyroscopic, self-erecting, air driven type, is gimbaled on the fore and aft axis by pivots 211, 211' located in gimbal ring 212, which, in turn, is pivoted in the brackets 213 and 214, forming parts of the casing 215. A stub shaft 217 projects from the top of the gyroscope housing and has secured thereto by two nuts 218 and 218' an H-shaped curved condenser plate 43 which is grounded to the case through shaft 217.

The condenser plate 43 is cylindrically bent concentrically around the minor gimbal axis 211—211' and conforms to the shape of four cylindrical segments 41 and 41', two of which are interconnected electrically by brackets 219 and 220'. Between the plate 43 and the segments 41 and 41' there is maintained a small air gap which is preferably uniform throughout, so that in case the gyro tilts around axis 211—211', no change of air gap occurs. Insulating strips 250 are shown bridging said segments for increasing the structural stiffness. However, a change in capacity will take place because the segments 41, 41' will change their angular position with respect to plate 43. If, for instance, the gyro should tilt with its top to the left in Fig. 6, the extended parts of plate 43 will cover more of the segments 41', while they will cover less of the area of the segments 41. The segments 41 are electrically connected to a circular ring 220, while the segments 41' are connected electrically to a similar but larger ring 221. Both these rings are mounted independently of each other and insulated against the frame on a ring 222, made of any suitable insulating material. This ring in turn, by means of screws 223, is mounted solidly on the gimbal ring 212 so that it will rotate with this ring. A ring 226, in every way identical to ring 220, is mounted directly opposite 220 on an insulating member 224 which, in turn, is connected to the bracket 213 by means of spring supported, adjustable screws 225. These screws are so adjusted that a uniform air gap is maintained between the rings 220 and 226. Similarly, a ring 227 is mounted in close proximity to the ring 221, maintaining an air gap between the rings of uniform thickness. The rings 227 and 226, in turn, are electrically connected to the outer terminals of transformer coils 44 and 44' of Fig. 2.

Having thus described how the tilting of the artificial horizon 210 around the fore and aft axis of the ship is converted into an electrical signal, a similar device serving on the athwartship axis will now be described. As shown in Figs. 6 and 7, a curved arm 228 is connected by screws 229 to the gimbal ring 212 and carries at its free end a semicircular plate 230 which, through the bracket 228, is grounded to the case. This plate 230 will swing with the gimbal ring 212 in case the artificial horizon oscillates around the athwartship axis. Mounted in close proximity to plate 230 and carried by an insulated disc 233 are two other semicircular plates 231 and 232. An end view of these three plates in their neutral position is given in Fig. 8. It is obvious from the foregoing description that in case of tilt around the athwartship axis, capacity between plates 230 and 231 will be increased, while capacity between plates 230 and 232 may be decreased. The condenser plates 231 and 232 are connected to the outer terminals of radio transmitter 102, shown in Fig. 2, so that an electrical signal will be generated in case of athwartship tilt of the artificial horizon.

The great advantage of this system of creating signals is in the fact that it is unnecessary to produce expensive spherical plates like the plates 43, 41 and 41', shown in Fig. 2, and more positive action is secured. Also, it should be noted that no slip rings and brushes have to be used, as the rings 220, 221, 226 and 227 constitute a very effective means of conducting alternating current from a moving part to another part without any of the parts touching each other and without creating any friction whatever.

Having explained how the indications of the gyro horizon are portrayed upon the face of the cathode ray tube 3, by means of a normally horizontal trace 9 in the middle of the tube which rises and falls in synchronism with the motions of the ship, tilts proportionally to the roll of the ship, and which is kept to a substantially constant length, the reproduction of the indications of the directional gyroscope 24 will now be described.

The means used for picking off signal potentials from the directional gyro are similar to those mentioned and explained in the copending application Ser. No. 101,274. The condenser plate 79 is pivoted for rotation eccentrically to its circumference but concentrically to the position of the condenser plates 80, 80', 81 and 81'. The rotation of the plate 79 caused by rotation of the directional gyro will successively unbalance the two pairs of fixed condenser plates. In other words, the point of maximum unbalance of capacity will move around in a circle together with the directional gyro. The radio frequency signals derived from the directional gyroscope are obtained in the same manner as explained for the gyro horizon 23. The radio frequency signal from one pair of condenser plates is conducted to the control grids of tube 82, while the similar signal from the other pair of plates is conducted to the control grids of tube 83. Both tubes are supplied with high voltage D. C. plate potential through leads 61, 65 and 65', respectively 76, 76'. Unbalanced signals will produce unbalanced D. C. potentials in the plate circuits of tubes 82 and 83, which appear across the center tapped resistors 62 and 67 and which are applied directly to the horizontal and vertical deflection plates of cathode ray tube 3, as explained before. Both tubes are biased by the bias battery 84 and also by a low A. C. voltage of 600 cycles derived from potentiometer 85. This potentiometer is fed with 600 cycles A. C. from transformer 69. There is therefore present in the output of both tubes 83 and 82, besides the D. C. potential, a small amount of 600 cycle A. C. which is not filtered out.

If we assume now that plates 80 and 80' are balanced but that there is an unbalance present between plates 81 and 81', it will be obvious that there would be no output from tube 82, while tube 83 will have maximum output. The result is that the cathode ray beam is continuously deflected to a spot near the circumference of the face of tube 3, as indicated by 7 in Fig. 1. The location of this spot is determined by the fact that there is a vertical deflection only, but no horizontal deflection. The small amount of A. C. present in the output serves to give the spot 7 a fixed radial length.

If, now, plate 79 should be turned through an angle of 90°, the vertical deflection would disappear while the horizontal deflection would attain a maximum. Spot 7 therefore would move to a place 90° from its present position in a clockwise direction, and as the maximum output voltages of tubes 82 and 83 are equal, it would move there along the circumference of a circle.

If plate 79 should be continuously rotated in one direction, as, for instance, if the plane flies in a circle, spot 7 would travel around the outer circumference of the face of the cathode ray tube adjacent to the markings 4, thereby indicating directly in degrees or terms of compass bearing the motion of the ship's fore and aft axis in azimuth.

For reproducing the position of turn indicator 25, we have shown a movable plate 86 fixed to the pointer of the instrument, while two stationary plates 87 and 87' are mounted on the frame of the turn indicator. In normal or neutral position, the capacity between plates 86, 87, and 86 and 87' would be equal and therefore tube 88 would receive equal radio frequency signals on both control grids. The radio frequency transformer and the associated trimmer condensers are similar, as explained for the preceding instruments.

If the ship turns, plate 86 will be deflected to one side or the other and the result will be an unbalancing of the signals on the control grids of tube 88. This, again, causes the appearance of variable reversible D. C. outputs across resistor 67 proportional in amplitude to the angular motion of the plate 86, their sign being controlled by the direction of rotation of the pointer of the turn indicator. This D. C. voltage is applied directly to the horizontal deflection plates of the cathode ray tube. It is used to horizontally deflect the vertical beam trace 11 of Fig. 1, which is generated by tube 89 in a similar way as explained for the vertical trace generated by tube 66, the 600 cycle signal being provided by a transformer 90 and adjustable as to amplitude by means of potentiometer 91. The tube is biased by battery 94. The 600 cycle output potential of this tube causes a vertical traverse of the beam through an angle controlled by the adjustment of potentiometer 91. The cooperation between tubes 88 and 89 now is such that in the neutral position of plate 86 the vertical beam is centered on the vertical diameter of the face of the tube, but that any deviation of plate 86 to one side or the other results in a proportional shift of the beam trace 11 to the right or left, as the case may be.

The circle trace of the cathode ray beam 12, as shown in Fig. 1, is produced by cooperation between tubes 104 and 105. Both of these tubes have a plate supply similar to the tubes discussed before. The signal applied to their control grids, however, are produced in such a way that there exists between them a phase difference of 90°. Transformer 106, which has its primary fed with 600 cycle A. C. from the terminals A and B of the dynamotor 31, has connected across its secondary an adjustable potentiometer 107, by which the amplitude of the signal voltage can be adjusted. Two phase-shifting networks are arranged across the active part of the winding of potentiometer 107, each consisting of a condenser and a resistor in series. The network feeding tube 105 consists of condenser 108 and resistor 109. The voltage across condenser 108 is applied directly to the control grids of tube 105 through two blocking condensers by means of a center tapped resistor 110 in such a way that the two grids are excited in phase opposition. The voltage across the condenser 108 is in phase quadrature with the voltage across resistor 111, which, with condenser 112, forms the second phase-shifting network controlling tube 104. The voltage across resistor 111 is fed to the grids of tube 104 through two blocking condensers and by means of a center tapped resistor 113 in a similar way as described for tube 105. A D. C. bias common to both tubes is applied between the cathode and the center points of resistors 110 and 113 by means of bias resistor 114, which carries the static plate currents of all tubes having the common cathode connection 101. The output of tubes 104 and 105 consists of amplified 600 cycle potentials, the phases of which are displaced 90° with respect to each other. One of these potentials is applied to the horizontal deflecting plates 39 and 39' of the cathode ray tube, while the other potential is applied to the vertical deflecting plates 40 and 40'. These two voltages applied in the above manner produce a beam trace forming a perfect circle provided the phase angle difference between the voltages is exactly 90°.

In its neutral position, the circle trace 12, as seen in Fig. 1, is concentric to the fuselage of the miniature airplane in the center of the face of the tube. In straight flight, the position of this circle trace is raised or lowered along the vertical diameter of the face of the tube according to the indication of the altimeter 28 in the following manner.

As shown schematically, the pointer of the altimeter 28 is provided with a small condenser plate 115, the center line of which is normally located exactly in the middle between two condenser plates 116 and 117. These condenser plates are mounted on a ring gear 118 of insulating material in such a way that the assembly can be turned to any desired position by means of pinion 119 and knob 120. If the ship is flying at an altitude at which condenser plate 115 covers condenser plates 116 and 117 to equal amounts, there will be no differential voltage generated and applied across the control grids of the tube 121. If, however, the ship should fly at a higher or lower altitude, so that plate 115 changes its position to the right or left, a differential potential of opposite phase would be applied to the control grids of the tube and a variable, reversible D. C. potential would appear in the output circuit of the tube. The plate potential for the tube is derived across a bias resistor 122, carrying the static plate currents of all tubes having the common cathode ground 101. This resistor has one end connected to the cathode of the tube and to the negative terminal 49' of the high voltage supply 49, 49' of the dynamotor 31. Its other end, through leads 123, 124, is connected to the midpoint of resistor 113, from the ends of which two leads are connected to the points 125 and 126 of a switch 13. In the flying position of this switch, as shown, the two points 125 and 126 are connected through corresponding switch contacts to the plates of the tube 121, and accordingly the variable reversible D. C. output of the tube 121 appears across resistor 113. This resistor then serves two purposes, namely, being the plate load for tube 121 and the input impedance for tube 104, both tubes working as a direct connected amplifier. The output of the tube 104 therefore will contain not only the 600 cycle potential used for drawing the circle trace, but superimposed on it a reversible variable D. C. potential which can deflect the whole circle up or down along the vertical diameter of the face of the cathode ray tube. The amount of deflection of the circle will correspond to the amount of deviation of the airplane from the altitude to which knob 120 was set, while the direction of deflection of the circle depends upon the direction of the deviation of the ship from the present altitude.

In actual flying practice, the flight indicator will be out of use until the ship has reached the desired altitude at which it is going to level out and which it is going to maintain during the major part of its course. At this point, the pilot energizes the instrument and observes where the circle 12 of Fig. 1 is located. He then turns knob 120 until circle 12 is located concentrically with the fuselage of the miniature representation of an airplane in the center of the tube and hereafter flies the ship in such a way as to keep this position of the circle constant. If the ship loses altitude, the circle will rise; if it gains altitude, the circle will be lowered, and if the pilot aims the ship so as to fly the airplane pictured on the face of the cathode ray tube through the circle 12, he will automatically apply the necessary corrections to the elevators by means of simple and direct reflex motions without the necessity of mental analysis.

It is also possible to provide the altimeter with an outer scale 200 graduated in thousands of feet and to use this scale to preset the altitude level at which the ship is supposed to fly. The 180° ambiguity present in the arrangement of plates 117 and 118 is not very dangerous, because it means a difference of 10,000 feet, a difference which is not easily overlooked. If the altitude has been set before take off, the instrument would be energized soon after, and the pilot would continue to climb until the concentric position of the circle trace 12 indicates that he has reached the preset level of altitude.

In the position of the switch 13, shown in the diagram, the course beam receiver 26 and the landing beam receiver 27 are disconnected from the cathode ray tube and no indications from these instruments are transmitted during normal flight. If, however, the ship approaches an airport, the pilot throws switch 13 into position 16, thereby disconnecting the altimeter output and connecting the two receivers 26 and 27 into the control circuits of tubes 104 and 105. The course beam receiver 26 has its output rectified by the double diode 127 so that there appears across the resistor 128, a variable reversible D. C. voltage which is zero if the airplane is correctly on the course and which becomes negative if the plane deviates in one direction or positive if the plane deviates in the other direction from the straight course along the beam. This D. C. potential through switch 13 is conducted to the control grids of the tube 105, and, by means of the resistor 110, influences the grids in opposite sense. It modulates the 600 cycle A. C. output of this tube in such a way as to deflect the circle trace 12 horizontally one way or the other, depending upon the deviation of the airplane from the radio course beam.

The landing beam receiver 27 has its output rectified by means of rectifier tube 129 so that a half wave rectified D. C. signal appears across resistor 130. This signal normally is balanced by a D. C. voltage derived across potentiometer 131, which is connected by the switch 13 to a 45 volt battery 132. If the airplane is correctly positioned with respect to the landing beam, the voltage across resistor 130 is equal to the one adjusted on the potentiometer 131, but of opposite sign, and therefore no D. C. signal is applied to the control grids of the tubes 104, which, through the switch 13 are connected to the potentiometer 131 and the resistor 130 respectively. If, however, the ship should be too high or too low with regard to the landing beam, the voltage across resistor 130 would be either higher or lower than the one adjusted by potentiometer 131, resulting in a variable reversible D. C. potential being applied to the control grids of the tube 104. The resistor 113 serves the purpose of exciting the grids in opposition to each other so that the D. C. voltage applied to the grids will result in a variable reversible D. C. output superimposed upon the normal 600 cycle output of tube 104. The D. C. content of the output of that tube will deflect the circle trace 12 upward or downward, as the case may be, thereby indicating the position of the aircraft with respect to the landing beam. In flying practice, the pilot attempts to direct his airplane so that the small airplane picture on the face of the cathode ray indicator is flying down a tube, the cross section of which is given by the circle trace 12. The directions of deviation of the circle trace from the center are arranged in such a way that the normal reactions of the pilot are correctly correlated to the motions of the small airplane picture with respect to the circle trace 12.

We have now fully described how the indications of a number of important flight instruments are made visible upon the face of the cathode ray tube, but if all of the signals from all instruments were applied simultaneously to the tube, the result would be an unintelligible mixture of cathode ray beam traces on the tube. It therefore becomes necessary to apply the different signals derived from the aircraft instruments to the deflection plates in rapid and periodical succession in such a way that only one of the instruments influences the cathode ray beam at any given instant but all are simultaneously visible due to the persistance of vision of the human eye and the persistence of luminosity of the cathode ray sensitized screen or face. To accomplish this purpose, we employ commutating means by which it is possible to successively activate certain groups of tubes while other groups of tubes are kept inoperative.

A convenient means to make active or inactive the particular type of tube used in this instrument is given by the screen grids. If a negative potential is applied to these grids, the tubes will cease to be operative and will pass no plate current, whereas if a positive potential of, say, 50 or 60 volts is applied to the screen grids, the tubes will become active and pass plate current, in such a way as to fulfill their normal functions in the control circuit. As will be seen from the diagram, the common cathode ground 101, shown by a heavy line in the diagram, is positive with respect to the negative terminal 49' of the high voltage supply due to the voltage drop across resistors 122 and 114. Therefore, as the center points of chokes 133 and 134 are connected to the negative terminal 49' of the power supply and as the screen grids of tubes 60, 66, 82, 83, 88, 104 and 105 are connected to the free ends of chokes 133 and 134 respectively, it is obvious that normally the screen grids of these eight tubes are negatively biased with respect to their cathodes, rendering the tubes inoperative.

The commutating device shown in the dot-dash box 135 comprises, besides the chokes 133 and 134, a number of transformer windings and gas filled electron discharge tubes. We prefer to use neon filled tubes, but tubes filled with other gases and having similar characteristics may be substituted. An A. C. supply of preferably 60 cycles is generated by the dynamotor 31 and conducted to the primary windings 136 and 137 of transformers 138 and 139. The condenser 140 serves the purpose of displacing the phase of the voltage across coil 136 90° with respect to the voltage across coil 137. Each of the secondaries 141, 142, 143, 144, through series resistors is connected across one each of the neon tubes 145, 146, 147 and 148 respectively. As soon as the A. C. voltage across these neon tubes reaches the so-called "striking" potential, these tubes will start to pass current. As the voltage drop across such tubes is constant, no further rise in voltage across the neon tubes is possible during the half cycle just started, thereby causing the wave form of the voltage across the neon tube to appear as a flat topped or square wave. The voltage across tube 145 is added to the voltage across tube 147 and the sum total of these potentials is applied to the choke 133 and from there to the screen grids of two pairs of vacuum tubes 60, 66 and 82, 83. The voltage across tube 146 is added to the voltage across tube 148 and the sum total of these potentials is applied across choke 144 and from there to the screen grids of two other pairs of vacuum tubes 88, 89 and 104, 105. The function of these added voltages is best explained by means of Fig. 3. $a$ shows the wave form of the voltage induced in secondary windings 143 and 144 connected to tubes 147 and 148. $b$ shows the flat topped voltage waves across each of these tubes resulting from the particular action of the neon tube after starting. The dotted line curve in part $c$ of Fig. 3 illustrates the wave form of the voltage induced in secondary winding 141 and this voltage is shown as 90° out of phase with the voltage of curve $a$. At $c$ furthermore is shown the flat topped wave form generated across tube 145. Addition of the flat topped waves shown at $b$ and $c$ is illustrated at $d$, showing that squared-shaped, sharply outlined impulses are produced during alternate quarter cycles of wave $a$. This is the wave form of the voltage applied to choke 133 and to the screen grids of two pairs of vacuum tubes, in such a way that the first impulse makes the screen grids of tubes 60 and 66 positive, while the screen grids of tubes 82 and 83 become negative during the same quarter cycle. The second impulse has opposite results, so that each group of tubes becomes operative once every full cycle for a time interval of less than one quarter cycle. The dotted line wave in part $e$ of Fig. 3 shows the voltage induced in winding 143 connected to tube 146, and comparison with curve $c$ shows this voltage to be 180° out of phase with that across tube 145. This reversal of phase is obtained by a reversal of the winding 142 with respect to winding 141. The addition of voltages $b$ and $e$ produces the dotted part of the wave shown at $f$. The heavily drawn wave in part $f$ of Fig. 3 is identical with the wave shown at $d$ and represents a combination of the waves shown at $b$ and $c$. Together the two waves show sharply defined flat-topped impulses of potential, one each during each quarter of a full cycle of the 60 cycle supply current. Inasmuch as the heavily drawn portion of the wave at $f$ is applied across choke 133 as explained before, and the dotted part of the wave is applied across choke 134, it is obvious that all four groups of vacuum tubes are made operative each during a different quarter cycle of the 60 cycle supply. During the remainder of the cycle, the screen grids are either subjected to the normal negative bias or they are made more negative. The four different groups of vacuum tubes which are used to draw and control traces on the face of the cathode ray tube now draw their particular traces successively one group at a time. However, as it is impossible to produce vertical initial rise for the wave $f$, there is a short interval of time during which there is little or no deflecting potential acting on the cathode ray beam so that the beam at that time will be returned to its neutral position in the center of the tube, thereby drawing the trace of its return path upon the screen of the cathode ray tube. These so-called "back traces" present a very confusing pattern and have to be eliminated. Part $g$ of Fig. 3 shows the interval $m$ during which the cathode ray beam is usefully employed and interval $n$ shows the time during which the beam returns to zero and draws a back trace. The back trace eliminator 149 consists of a similar arrangement of neon tubes which, however, are supplied with A. C. of double frequency as compared with the commutator 135, which is described as supplied with 60 cycle A. C. This 120 cycle A. C. supply may be provided from the terminals 150 and 150' of the dynamotor 31 and energizes the primary winding 157 of transformer 152, two secondaries of which are energizing two neon tubes 153 and 154. Phase shifting means of known design are used in conjunction with their secondaries so that tube 153 receives a potential, the phase of which is shifted about 10° with respect to the phase of potential across coil 157, while tube 154 receives a potential which is shifted about 80° with respect to the potential across coil 157. The resulting square-topped waves are shown in their correct phase relation at $h$ and $i$ in Fig. 3 where $o$ represents the 10° phase shift of wave $h$, and $p$ the 80° phase shift of wave $i$. If these waves are added together, as shown in the wiring diagram, a pattern represented by wave $k$ in Fig. 3 is produced where the interval $q$ represents about 15° and $r$ represents about 65° of the total 360° of a cycle. A full wave rectifier tube 155 in conjunction with a center tapped choke 156 is used to provide full wave rectification for $k$ of Fig. 3 so that there appears across resistor 37 a series of impulses as shown by pattern $l$ of Fig. 3. The peaks of the impulses, shown as negative impulses at $l$ appear at the same place where the intervals $n$ were located. It will be remembered that the interval $n$ was that time during which the cathode ray beam draws its back trace. If now, the impulses as shown at $l$ and as available across resistor 37 are applied between the grid and cathode of the cathode ray tube in such a way that the grid 36 is periodically made negative, the cathode ray beam will disappear every time one of the impulses shown at $l$ is applied. In this way, the back trace of the beam is completely eliminated and the indications of the flight instruments appear as a number of perfectly clear, well-defined separate beam traces on the face of the tube. Due to the fact that the patterns are drawn by 600 cycle A. C., a number of cycles of the pattern drawing voltages are completed during the time $m$ of active operation of the control tubes. The fact that the sensitized screen of the cathode ray tube retains a certain amount of luminosity for an appreciable time interval after the cathode ray beam has been extinguished, tends to prevent flickering of the beam traces.

Fig. 4 shows the cathode ray beam traces on the face of the indicator, as they would appear during a landing operation. The airplane is flying to the left of the course beam and flying high with respect to the landing beam. It is just now engaged in making a clockwise turn, slightly banked, and descending at the same time in an effort to steer the airplane into the center of the circle trace, 12.

Fig. 5 shows a typical pattern of beam traces during normal flight. The airplane is flying low with respect to the level set on the altimeter 28, as shown by the relative position of the circle trace 12. Also, the airplane is just making a counter-clockwise turn, at the same time banking about 15°. The corresponding motion of the course indicator spot 7 will have to be imagined as being counter-clockwise at the same time.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It should be understood that the functioning of the control devices for the cathode ray beam indicator has been explained in a diagrammatic way only, and that equal results can be obtained with a variety of different means, all following the same principle. It should be noted that instead of obtaining bias voltages from batteries, as generally shown in the diagram, these voltages are obtained by other well known biasing devices without in any way changing the performance of the instrument.

It will be apparent that the cathode ray tube may be provided with deflecting coils instead of deflecting plates, as is well known to those skilled in the art, and wherever deflecting means are mentioned in the claims, it is to be understood that this term will cover deflecting plates as well as deflecting coils.

It also should be understood that the scope of this invention is not limited to the use of a cathode ray indicator as a flight instrument. It is possible to use the indicator for other purposes, where it is desired to obtain indications of a plurality of separate signals simultaneously on the face of the tube. Signals could be derived from other sources than flight instruments and could indicate conditions other than flight attitudes. However, no matter what the nature and origin of the signals, and no matter what the appearance of the characteristic beam traces, in all cases the method used to impress the signals continuously upon a group of electron discharge tubes and to produce the different beam traces separately, periodically and in rapid succession, one at a time, would be substantially as described above.

It should be noted that wherever the term "flight conditions" is used in the claims, it intends to include not only the different flight attitudes of the craft, such as banking, climbing or descending, but also conditions as to positions with respect to the ground expressed in altitude, as to turning with respect to the north and as to position with respect to a radio course beam and a radio landing beam.

What is claimed is:

1. In a cathode ray tube flight indicator for aircraft, a plurality of flight instruments including an altimeter, electronic means adapted to deflect the electron beam in a horizontal trace normally located along the horizontal diameter of the face of the tube and indicative of an artificial horizon, second electronic means adapted to deflect said beam in a vertical trace normally located along the vertical diameter of said face and indicative of a turn indicator, third electronic means adapted to deflect said beam to form a spot movable along the periphery of said face and indicative of a direction indicator, fourth electronic means adapted to deflect said beam into a circle normally located at the center of said face and indicative of the position of the aircraft as given by said altimeter, a common plate supply for all of said electronic means, biasing means adapted to normally render inactive said electronic means, and electronic commutating means to successively and periodically render active one after the other of said electronic means.

2. In a cathode ray flight indicator of the type described, electronic means to draw upon the face of the cathode ray tube a bar trace of fixed length normally positioned along the horizontal diameter of said face to represent the indicator of a horizon instrument, electronic means for tilting said bar upon roll of said aircraft, and a third electronic means adapted to control said first named electronic means to automatically maintain said fixed length of said bar trace when said trace is tilted by applying a bias voltage proportional to roll.

3. In a cathode ray flight indicator, a gyroscopic horizon, a transverse pick-off means therefor including a cylindrical condenser plate grounded to the artificial horizon structure, two pairs of interconnected cylindrical condenser plates concentric and adjacent to said first condenser plate, a gimbal ring supporting the horizon gyro and said two pairs of condenser plates, a pair of annular condenser plates supported on said gimbal ring coaxially and concentrically to the transverse axis of said ring and electrically connected to said two pairs of condenser plates, respectively, a housing for said gyro, and a second pair of annular condenser plates substantially identical to said first named pair of annular condenser plates and supported by said case in concentric and coaxial relation to said first named annular plates and in close proximity thereto, said first named pair and said second named pair of annular plates forming a pair of condensers adapted to maintain a conducting path for alternating current of constant impedance regardless of tilt of said gimbal ring with respect to said housing.

4. In a cathode ray flight indicator, a gyroscopic horizon having a gimbal ring mounting, a transverse condenser pick-off means therefor, including a grounded cylindrical condenser plate carried by said horizon, a housing supporting said gimbal ring and having a pair of terminals, a pair of cylindrical segments forming condenser plates and adapted to differentially engage said cylindrical condenser plate, said cylindrical segments being fixedly and symmetrically mounted on said gimbal ring in concentric coaxial relation and closely adjacent to said cylindrical condenser plate, and means of constant impedance to electrically connect said pair of segments to said pair of terminals, respectively.

5. In a gyroscopic horizon for cathode ray indicators having differential condenser pick-off means adapted to generate electrical signals substantially proportional to tilt in at least one direction of said horizon, a gimbal ring to support said horizon for oscillation around one axis, a frame to support said gimbal ring for oscillation around an axis perpendicular to said first axis, a pair of annular condenser plates fixedly supported on said gimbal ring in coaxial and concentric relation to the axis of rotation thereof, and electrically connected to said condenser pick-off means, and a second pair of annular condenser plates supported by said frame in concentric and coaxial relation and closely adjacent to said first pair of annular condenser plates, said first and said second pair of condenser plates forming a pair of condensers adapted to maintain a frictionless conducting path for alternating current of constant impedance regardless of tilt of said gimbal ring around said perpendicular axis.

6. In a cathode ray flight indicator, a gyroscopic horizon having pick-off means, a gimbal ring to support said horizon, a frame having two terminals and adapted to support said gimbal ring, a pair of two element condenser means having one element each fixed to said gimbal ring and the other element each fixed to said frame, means to connect said first elements to said condenser pick-off means, and means to connect said second elements to said terminals, said pair of two element condenser means being adapted to maintain their impedance constant upon tilt of said horizon.

7. As a navigational aid, mounted on a common aircraft, a plurality of instruments furnishing attitude, direction and altitude information including an altimeter, means cooperative with said altimeter for setting a desired reference altitude, means mounted on said altimeter for creating potentials proportional to departure from said set altitude, a cathode ray tube, supply circuits therefor, means for repeating the indications of said several instruments as luminous movable patterns on the face of said tube, including means for drawing a distinctive pattern movable to represent change of altitude from said set value, and means for applying the potentials derived from said altimeter to move said altitude indication across a common field of view with said other indications.

8. Apparatus mounted on an aircraft as an aid in piloting the craft comprising in combination, a plurality of instruments responsive to flight conditions, a single cathode ray tube, and means for transferring the indications of said instruments to the face of said tube as simultaneously visible distinctive patterns movable in accordance with the responses of said several instruments including an A. C. supply, means for deriving from said supply and applying to the deflecting means of said tube potentials adapted to cause luminous patterns to be drawn on the face of said tube individually distinctive of said several instruments, means for translating the responses of said several instruments into potentials adapted to control the positions of the respective patterns on the face of said tube in accordance with said responses, and electronic commutating means for flashing said patterns on the face of said tube in sufficiently rapid sequence to be continuously visible and for applying said several position controlling potentials to the deflecting means of said tube in similar rapid sequence.

9. Apparatus mounted on an aircraft as an aid in piloting the craft comprising in combination, a plurality of instruments responsive to flight conditions, a single cathode ray tube, means for transferring the indications of said instruments to the face of said tube as simultaneously visible distinctive patterns movable in accordance with the responses of said several instruments including an A. C. supply, means for deriving from said supply and applying to the deflecting means of said tube potentials adapted to cause luminous patterns to be drawn on the face of said tube individually distinctive of said several instruments, means for translating the responses of said several instruments into potentials adapted to control the positions of the respective patterns on the face of said tube in accordance with said responses, electronic commutating means for flashing said patterns on the face of said tube in sufficiently rapid sequence to be continuously visible and for applying said several position controlling potentials to the deflecting means of said tube in similar rapid sequence, and electronic means for deriving potentials to render said cathode ray tube inoperative in the interval between the completion of the drawing of one of said patterns and the commencement of the drawing of the next succeeding pattern, whereby the assembly of said luminous patterns is undistorted by traces interconnecting the individual patterns.

10. Apparatus mounted on an aircraft as a piloting aid comprising in combination a plurality of instruments responsive to flight conditions, a single indicator of the cathode ray tube type, a fixed marking on the face of said indicator representing in miniature an airplane as seen in transverse section including a central circular fuselage portion with wings extending laterally therefrom, means for causing the beam of said cathode ray tube under normal flight conditions to trace upon the face of said indicator as a luminous image the outline of a miniature airplane comprising a central circular trace representing the fuselage and a horizontal trace having portions extending laterally from said circle to represent the wings, said luminous image being normally closely associated, part by part, with said fixed marking, and means for causing the changed responses of said several instruments upon departure of the craft from normal flight conditions to displace said circular and horizontal traces independently from said normal positions.

11. Apparatus mounted on an aircraft as a navigational aid comprising in combination, a horizon instrument, an altimeter, pick-offs associated with said instruments for producing voltages responsive to the respective indications thereof, a single cathode ray tube, a fixed marking on the face of said tube representing in miniature a transverse section of an airplane including a central circular portion representing the fuselage and horizontal wing portions extending laterally therefrom, means for deflecting the electron beam within said tube to trace on the face thereof a horizontal line and a circle, said line under normal flight conditions coinciding with the wing portion of said miniature plane and said circle under normal flight conditions being concentric with said fuselage portion, and means for causing said pick-off voltages to displace said line and circle from said normal positions responsive to departure of the aircraft respectively from a horizontal attitude and from a normal altitude, whereby in maneuvering said aircraft to maintain said line and circle in their normal positions an illustion of flying said miniature airplane is created.

12. Apparatus mounted on an aircraft as a navigational aid comprising in combination, a horizon instrument, a radio receiver furnishing an output proportional to horizontal deviation of the craft from a radio beam, a radio receiver furnishing an output proportional to vertical deviation of the craft from said beam, pick-offs associated with said horizon instrument for producing voltages responsive to the indications thereof, a single cathode ray tube, a fixed marking on the face of said tube representing in miniature a transverse section of an airplane including a central circular portion representing the fuselage and horizontal wing portions extending laterally therefrom, means for deflecting the electron beam within said tube to trace on the face thereof a horizontal line and a circle, said line under normal flight conditions coinciding with the wing portion of said miniature plane and said circle under normal flight conditions being concentric with said fuselage portion, means for causing voltages derived from said pick-offs to displace said line from its normal position responsive to departure of the aircraft from a horizontal attitude, and means for causing the outputs of said receivers to displace said circle respectively horizontally and vertically from its normal position responsive to departure of the aircraft from said radio beam whereby in maneuvering said aircraft to maintain said line and circle in their normal positions an illusion of flying said miniature airplane is created.

FRANCIS L. MOSELEY.
JOSEPH LYMAN.